Sept. 11, 1962  F. R. KERNS  3,052,968
BATTERY SEPARATOR POSITIONING MACHINE
Filed Dec. 23, 1959  2 Sheets-Sheet 1

INVENTOR.
FRED R. KERNS
BY
Robert I. Staples
ATTORNEY

Sept. 11, 1962 F. R. KERNS 3,052,968
BATTERY SEPARATOR POSITIONING MACHINE
Filed Dec. 23, 1959 2 Sheets-Sheet 2

INVENTOR.
FRED R. KERNS
BY
Robert J. Stephens
ATTORNEY

United States Patent Office

3,052,968
Patented Sept. 11, 1962

3,052,968
BATTERY SEPARATOR POSITIONING MACHINE
Fred R. Kerns, Cleveland Heights, Ohio, assignor to The Electric Storage Battery Company, a corporation of New Jersey
Filed Dec. 23, 1959, Ser. No. 861,634
5 Claims. (Cl. 29—204)

The present invention generally relates to a machine adapted for use in the manufacture of electric batteries. More specifically, the present invention is concerned with a machine which is operative to position battery separators with respect to the battery electrodes.

Storage batteries generally comprise a plurality of interconnected cell elements, the individual cell elements being made up of a group of positive plates and negative plates which are interleaved with porous non-conductive separators placed between each positive and negative plate. In manufacture, the plates of each respective polarity are connected together by burning or molding lead straps to the plate lugs which project outward from the periphery of the plates. In many modern battery production lines this operation is performed by a machine which is adapted to automatically cast the aforementioned straps to the plate lugs of the individual battery plates. In the operation of such a machine, it is generally necessary that the battery separators which are positioned between the plates be retarded or set back from the plate lugs in order that the interconnected straps may be automatically cast. It is also necessary that the separators extend equally beyond each side of the battery plate in order that the unconnected electrodes of the battery element be properly positioned to receive the cast-on strap.

Accordingly, it is a specific object of the present invention to provide means for automatically positioning the separators of an unconnected battery element with respect to the plates of such an element.

It is another object of the present invention to provide a new and improved machine for positioning battery separators which is simple to construct, efficient in operation and relatively inexpensive to manufacture.

It is a further object of the present invention to provide a machine for improving the uniformity of battery elements and to provide means for improving the mechanization of their manufacture.

In accordance with the present invention, there is provided a vibratable platform adapted to receive the unconnected interleaved battery plates and separators of a battery element. Guide means are provided on the vibratable platform to align the battery plates with respect to each other and centering means are provided to align the separators with respect to the plates. These aligning functions are carried out while the platform is vibrated to free the electrodes and separators from each other. Means are provided to automatically start a vibrating cycle upon the placing of an unconnected battery element on the platform, the vibration continuing for a predetermined time.

A better understanding of the present invention may be had from the following description when read with reference to the accompanying drawings of which:

Figure 1:
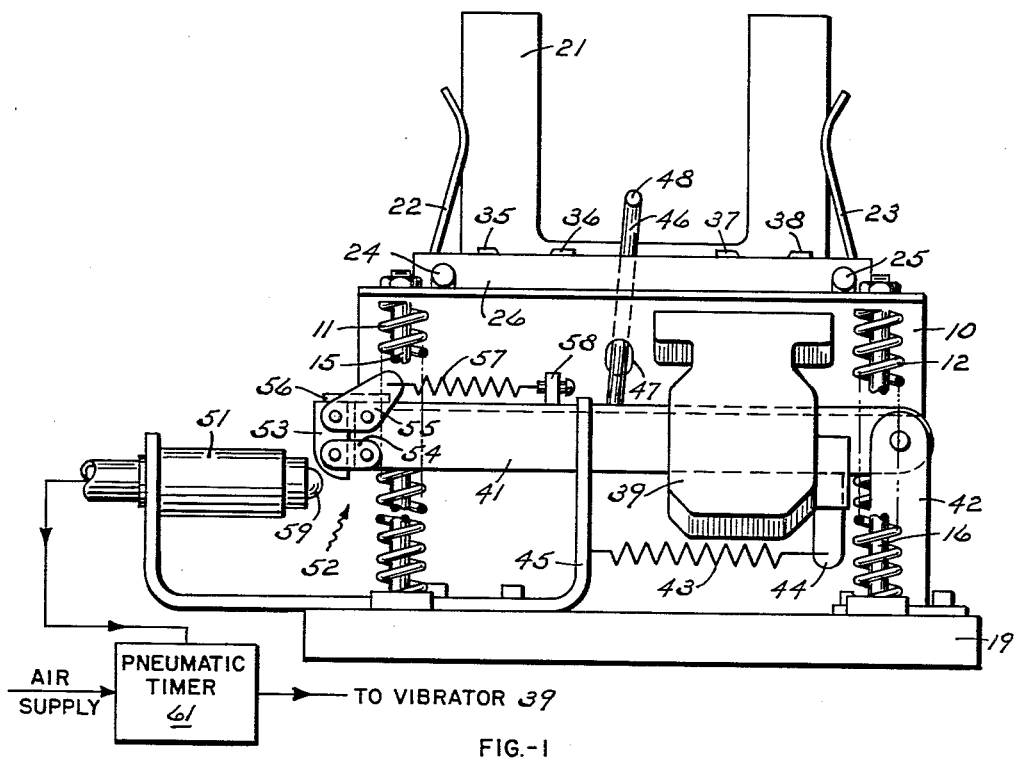
FIG. 1 is a front elevation of an embodiment of the present invention.

Referring now to the drawings, numeral 10 designates a vibratable platform supported at its four corners on the springs 11, 12, 13, and 14. The platform 10 is maintained on the springs 11, 12, 13, and 14 by the bolts 15, 16, 17, and 18 respectively which extend upward from a base plate 19 through these springs. As shown, the platform 10 is inclined at an angle of 15°, sloping downward toward its rear. Accordingly, the springs 13 and 14, supporting the platform 10 at its rear corners, are shorter than the springs 11 and 12 which support the platform at its front corners.

Figure 2:
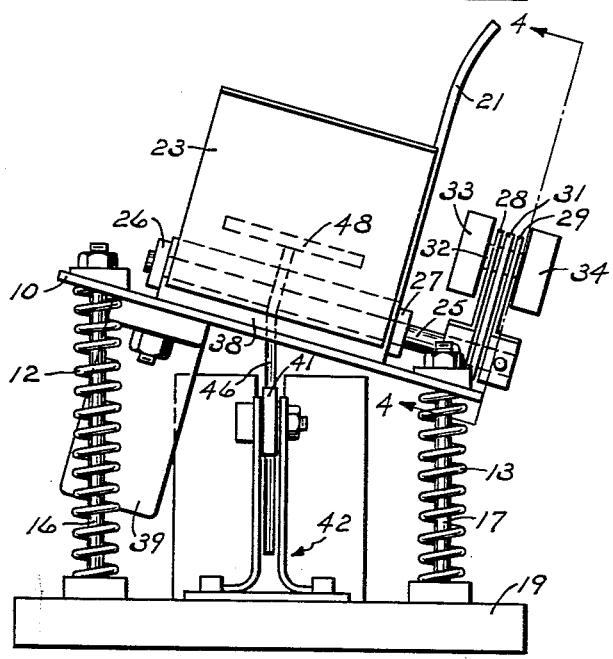
FIG. 2 is a side elevation of an embodiment of the present invention shown in FIG. 1.
Figure 4:
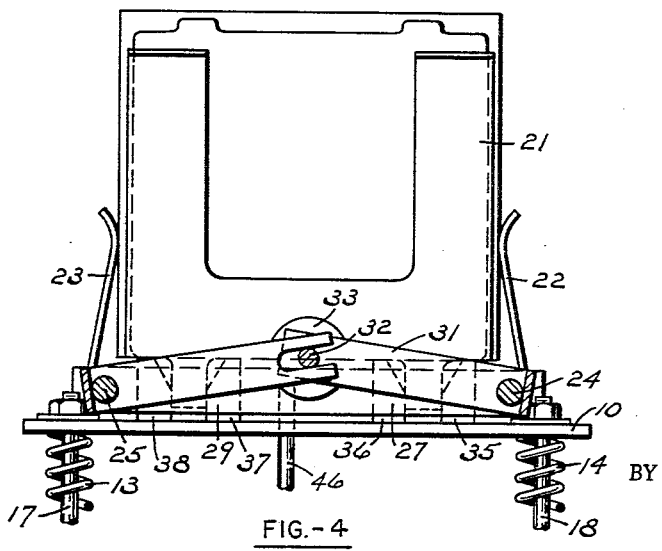
FIG. 4 is a rear elevation of the vibratable platform of FIG. 3 with a battery element inserted therein.

Mounted on the vibratable platform 10 and at right angles therewith is the battery element supporting the plate 21 which forms with the vibratable platform 10 a trough adapted to receive the interleaved battery plates and separators of an unconnected battery element. Pivotally mounted at the ends of the trough formed at the rear support 21 and the vibratable platform 10 are the separator centering leaves 22 and 23. As shown, the separator centering leaves 22 and 23 are fixedly mounted on the rotatable shafts 24 and 25 respectively, which are journaled in the parallel members 26 and 27. A pair of equalizing arms 28 and 29 are fixedly mounted to the shaft 25 and a single equalizing arm 31 is fixedly mounted to the shaft 24. As best shown in FIGS. 2 and 4, the equalizing arm 31 carries a pin 32 at the ends of which are mounted a pair of weights 33 and 34. The pin 32 is adapted to ride in slots in the ends of the equalizing arms 28 and 29 which extend between the weights 33 and 34 and the equalizing arm 31. By means of this construction, the equalizing arms will rotate with the shafts 24 and 25 by equal amounts under the influence of the weights 33 and 34 simultaneously, the separator centering leaves 22 and 23, which are fixedly mounted on the shafts 24 and 25, are urged inward by equal amounts against the separators of a battery element placed between them.

Extending between the parallel members 26 and 27 are four plate lug guide bars 35, 36, 37, and 38. The plate lug guide bars 35 and 36 are spaced so as to receive between them the lugs of battery plates of one polarity of the unconnected battery element and similarly, the plate lug guide bars 37 and 38 are adapted to receive the lugs of the plates of the opposite polarity. The two pairs of plate lug guide bars are equally spaced with respect to the center of the vibratable platform 10 and serve to align the battery plates of an unconnected battery element with respect to each other.

Mounted on the underside of the vibratable platform 10 is a vibrator means 39 which is adapted to vibrate the platform 10. As will be obvious to one skilled in the art, the vibrator means 39 may be of the electric or pneumatic type. As shown here, the vibrator means 39 is a pneumatic type operating on compressed air. By way of illustration, the vibrator means 39 may be of the type available on the market under the trade name "Vibrolator" type CD-35, manufactured by the Martin Engineering Company.

The switch means controlling the vibrator 39 is mounted on the base plate 19. This switch means includes the switch arm 41 which is pivotally mounted on the vertical supporting members 42 which extend upward from the base plate 19. When there is no battery element on the platform 10, the switch arm 41 is maintained in a position horizontal to the base plate 19 by means of a spring 43 which extends between the spring arm 44, which projects downward from the switch arm 41 and one arm of a U-shaped bracket 45. An actuating arm 46 extends upward from the switch arm 41 through a hole 47 in the platform 10 and carries at its end an actuating bar 48 which is adapted to engage a battery element placed on the platform 10 and depress the switch arm 41. A ball operated pneumatic pilot valve 51 is mounted on the other arm of the U-shaped bracket 45 and is adapted to be engaged by a pilot valve actuating mechanism generally designated 52, carried on the arm of the switch arm 41.

The valve actuating mechanism 52 comprises a pawl 53 pivotally mounted on the end of the switch arm 41 by means of the hinge members 54 and 55. A stop plate 56 mounted on the top of the switch arm 41 and projecting outward therefrom abuts against the end of the pawl 53 and prevents it from being pivoted upward on the members 54 and 55. The pawl 53 is held in a vertical position with its end against the stop plate 56 by means of a spring 57 which extends between an upward projection on the hinge member 55 and a spring mounting member 58 which is adapted to provide for adjustment of the tension on the spring 57.

Figure 3:
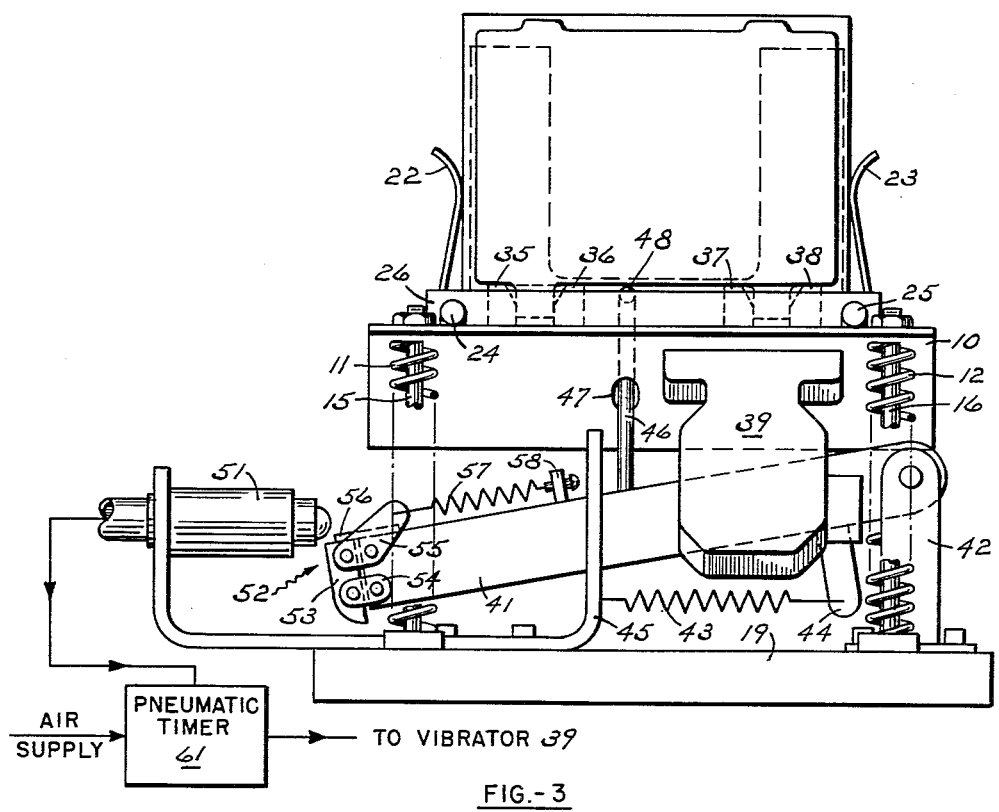
FIG. 3 is a front elevation of the embodiment of the present invention shown in FIG. 1 with a battery element inserted therein.

In operation, when a battery element is placed on the platform 10 and the switch arm 41 is depressed, the pawl 53 engages the operating ball 59 of the pneumatic pilot valve 51, forcing it inward to initiate the element vibrating cycle. As shown schematically in FIGS. 1 and 3, the pilot valve 51 controls the operation of a pneumatic timer 61 which in turn controls the air supplied to the pneumatic vibrator 39. The pneumatic timer 61 may be of the type available on the market under the trade name "Meadmaster" timer, model 1, manufactured by the Mead Specialties Co., Chicago, Illinois. The timer 61 is operable to supply air for the operation of the vibrator 39 for a preset period of time. At the end of the vibrating cycle as controlled by the timer 61, the battery element is removed from the vibrator platform by the operator. When this is done, the switch arm 41 is raised to a horizontal position under the action of the spring 43. As the pawl 53 is moved upward passed the control ball 59 of the pilot valve 51, however, the pawl is pivoted downward so as to slip by the ball 59 without depressing it. To this end, the tension of the spring 57, as controlled by the adjustment 58 is set so as to permit the pawl 53 to be pivoted downward upon engagement with the ball 59 on the upward swing of the arm 41. It should be noted that as a result of the action of the stop plate 56, the pawl 53 depresses the ball 59 on a downward swing of the arm 41.

By way of review, the operating cycle of the apparatus of the present invention is initiated by placing of the interleaved separators and battery electrodes of an unconnected battery element on the vibratable platform 10 between the separator centering leaves 22 and 23. When the actuating bar 48 is engaged by the battery element, the switch arm 41 is pivoted downward causing the pilot valve actuating mechanism 52 to operate the pneumatic pilot valve 51. The pilot valve 51 triggers the operation of a pneumatic timer 61 which causes compressed air to be supplied to the vibrator 39. The vibrating platform 10 is then vibrated by the action of the vibrator 39 for the period of time controlled by the setting of the pneumatic timer 61. Under the influence of the vibrations thus created, the interleaved battery elements and separators are freed from each other and the battery elements are aligned with respect to each other as their lugs drop into the spaces between the guide bars 35 and 36 and 37 and 38 under the influence of gravity. As this occurs, the separators drop downward and are aligned vertically against the top of the guide bars and are centered with respect to the plates by the action of the separator centering leaves 22 and 23 which are urged inwardly against the separators by equal amounts as a result of the action of the weights 33 and 34. The period of vibration of the platform 10 as set by the timer is made such as to be sufficient to accomplish the aforedecided cycle of operation. When the platform stops vibrating, the operator can remove the aligned elements which permits the switch arm 41 to be swung upward under the influence of the spring 43 which readies the device to receive the next battery element.

It has been found possible by means of the battery separator positioning device of the present invention to achieve a uniformity of battery elements which has heretofore been unobtainable. This not only provides for more uniform and more predictable battery operation, but also permits the mechanism of the latter steps of battery manufacture.

Having described the present invention, what is claimed as new is:

1. Apparatus for positioning battery separators with respect to battery electrodes comprising, in combination, a vibratable platform, a supporting member on said platform adapted with said platform to receive and support the unconnected interleaved separators and electrodes of a battery element in a substantially upright position with the lugs on said electrodes extending downward toward said platform, means on said platform for receiving and holding against lateral movement said downwardly extending lugs and thereby to orient said electrodes with respect to said platform, a pair of separator centering leaves pivotally mounted on said platform, one of said centering leaves adapted to pivot and bear against one side of said separators, the other of said centering leaves being adapted to pivot and bear against the opposite edges of said separators, said centering leaves being linked for equal movement around their respective pivots and means for vibrating said platform to free said interleaved separators from said electrodes and permit said centering leaves to move and position said separators laterally with respect to said electrodes.

2. Apparatus for positioning battery separators with respect to battery electrodes comprising, in combination, a spring mounted platform, a supporting member on said platform adapted with said platform to provide a trough adapted to receive and support the unconnected interleaved separators and electrodes of a battery element in a substantially upright position with the lugs on said electrodes extending downward toward said platform, means on said platform for receiving and holding against lateral movement said downwardly extending lugs and thereby to orient said electrodes with respect to said platform, a pair of separator centering leaves pivotally mounted on said platform, one of said centering leaves adapted to pivot against one edge of said separators, the other of said centering leaves being adapted to pivot against the opposite edge of said separators, said centering leaves being linked for equal movement around their respective pivots, weighted means for urging said centering leaves against said separators, and means for vibrating said platform to free said interleaved separators from said electrodes and permit said centering leaves to move and position said separators laterally with respect to said electrodes.

3. Apparatus for positioning battery separators with respect to battery electrodes comprising, in combination, a vibratable platform, a supporting member on said platform adapted with said platform to receive and support the unconnected positive and negative electrodes and interleaved separators of a battery element in a substantially upright position with the lugs on said electrodes extending downward toward said platform, means on said platform for receiving and holding against lateral movement said downwardly extending lugs on said positive electrodes, means on said platform for receiving and holding against lateral movement said downwardly extending lugs on said negative electrodes, a pair of separator centering leaves pivotally mounted pivoted on said platform, one of said centering leaves adapted to pivot and bear against one edge of said separators, the other of said centering leaves being adapted to pivot and bear against the opposite edge of said separators, said centering leaves being linked for equal movement around their respective pivots, weighted means for urging said centering leaves against said separators and means for vibrating said platform to free said interleaved separators from said electrodes and permit said centering leaves to move and position said separators laterally with respect to said electrodes.

4. Apparatus for positioning battery separators with respect to battery electrodes comprising, in combination, a spring mounted platform, a supporting member on said platform adapted with said platform to provide a trough adapted to receive and support the unconnected positive and negative electrodes and interleaved separators of a battery element in a substantially upright position with the lugs on said electrodes extending downward toward said platform, means on said platform for receiving and holding against lateral movement said downwardly extending lugs on said positive electrodes, means on said platform for receiving and holding against lateral movement said downwardly extending lugs on said negative electrodes, a pair of separator centering leaves pivotally mounted on said platform, one of said centering leaves adapted to pivot and bear against one edge of said separators, the other of said centering leaves being adapted to pivot and bear against the opposite edge of said separators, said centering leaves being linked for equal movement around their respective pivots, weighted means acting on said centering leaves to pivot them against said separators, means for vibrating said platform to free said interleaved separators from said electrodes and permit said centering leaves to move and position said separators laterally with respect to said electrodes and means engaged by said battery element when placed in said trough for controlling the energizations of said vibrating means.

5. Apparatus for positioning battery separators with respect to battery electrodes comprising, in combination, a vibratable platform, a supporting member on said platform adapted with said platform to receive and support the unconnected positive and negative electrodes and interleaved separators of a battery element in a substantially upright position with the lugs on said electrodes extending downward toward said platform, a first pair of guide bars on said platform spaced from each other to receive between them and hold against lateral movement said downwardly extending lugs on said positive electrodes, a second pair of guide bars on said platform spaced from each other to receive between them and hold against lateral movement said downwardly extending lugs on said negative electrodes, a pair of separator centering leaves pivotally mounted pivoted on said platform, one of said centering leaves adapted to pivot and bear against one edge of said separators, the other of said centering leaves being adapted to pivot and bear against the opposite edge of said separators, said centering leaves being linked for equal movement around their respective pivots, weighted means acting on said centering leaves to pivot them against said separators and means for vibrating said platform to free said interleaved separators from said electrodes and permit said centering leaves to move and position said separators laterally with respect to said electrodes.

References Cited in the file of this patent

UNITED STATES PATENTS

| | | |
|---|---|---|
| 2,296,479 | Nichols | Sept. 22, 1942 |
| 2,539,318 | Orsino | Jan. 23, 1951 |
| 2,768,431 | Hughes | Oct. 30, 1956 |